United States Patent Office 3,264,207
Patented August 2, 1966

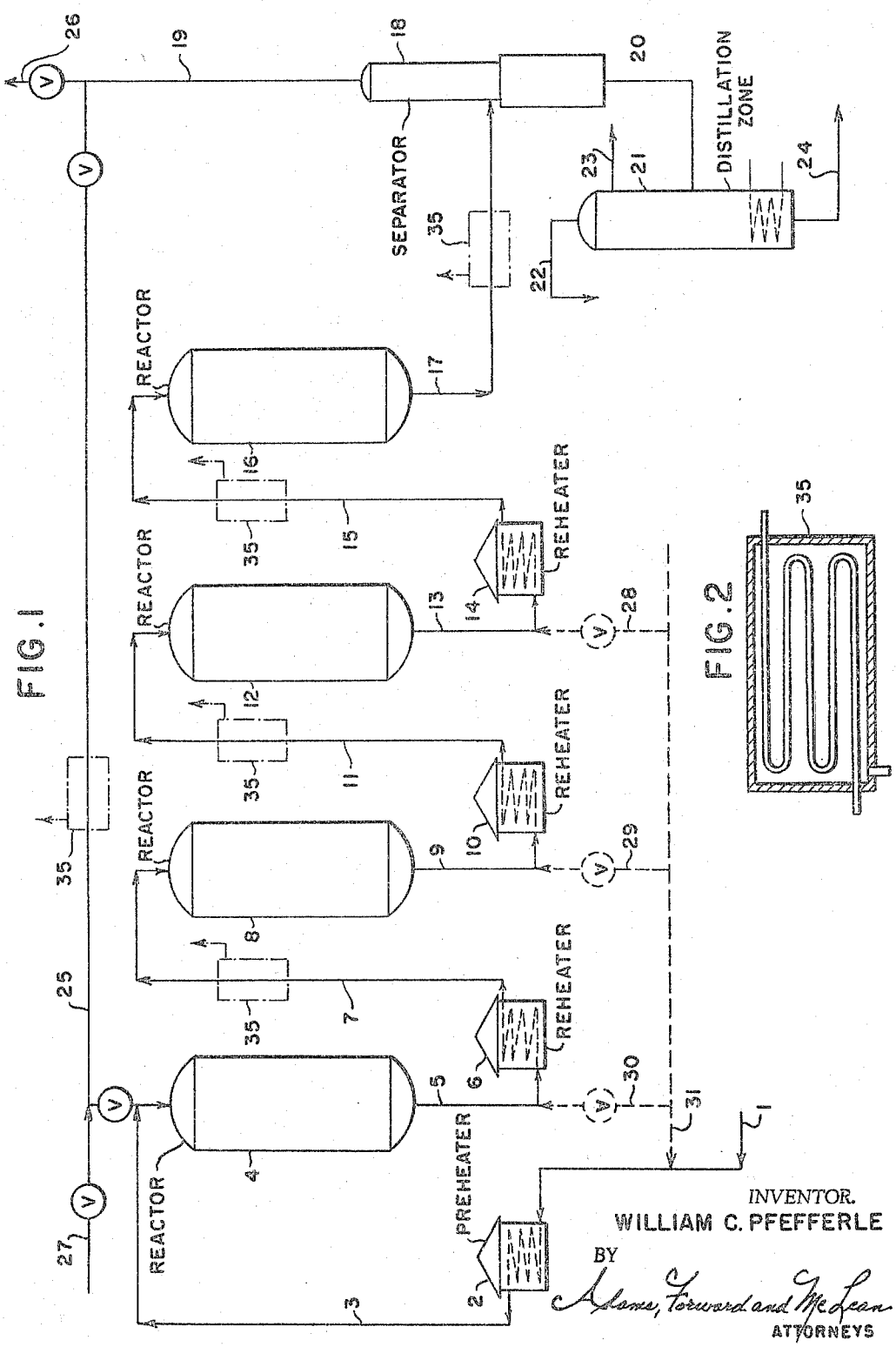

3,264,207
CONTROLLING HYDROGEN PARTIAL PRESSURE IN A REFORMING PROCESS
William C. Pfefferle, Middletown, N.J., assignor, by mesne assignments, to Sinclair Research, Inc., New York, N.Y., a corporation of Delaware
Filed Sept. 8, 1961, Ser. No. 136,950
6 Claims. (Cl. 208—65)

This invention is a continuation-in-part of my copending application Serial No. 125,994, filed July 24, 1961, now abandoned.

The present invention pertains to the catalytic reforming of petroleum naphtha. More specifically the present invention relates to a new and improved method of operating a multiple bed catalytic reforming system. Particularly the instant invention provides a method of realizing substantially all of the benefits obtained in low pressure reforming in such a system while maintaining a relatively high pressure.

In the reforming of hydrocarbons, particularly straight run naphtha fractions, using for instance a platinum group metal-alumina catalyst, various reactions occur, such as isomerization, dehydrocyclization, dehydrogenation, and hydrocracking, all of which lead to hydrocarbon products of increased octane ratings usually greater than about 80 to 85 RON (neat). After a period of use in such a system, however, the catalyst becomes gradually deactivated due to the deposition of coke particles on the surface of the catalyst and consequently a decrease in the octane values of the reformate product is observed. If the octane requirements imposed upon the particular system are to be continuously met, the catalyst must therefore be restored in activity with this usually being accomplished by various regeneration techniques involving the burning of carbon from the catalyst by contact with an oxygen-containing gas.

The reforming process is conventionally carried out under conditions including contacting the feedstock, for instance a straight run naphtha, with a reforming catalyst at about 875 to 975° F. and at about 250 to 500 p.s.i.g. pressure at a weight hourly space velocity (WHSV) within the range of about 0.5 to 5 and a hydrogen recycle ratio of about 4:1 to 12:1 moles based on the moles of naphtha feed. The catalyst employed can be a supported platinum catalyst containing for instance about 0.1 to 1.5 percent by weight platinum, preferably from about 0.3 to 1.0 percent and the support can be alumina characterized for instance by high surface area and large pore size. Such catalysts can be conveniently prepared as described in U.S. Patents Nos. 2,838,444 and 2,838,445. When employing these reforming operations a plurality of adiabatic catalyst beds are usually provided, for instance 3, 4, 5 or more in number, and the hydrocarbon feed can be preheated to the desired inlet temperature before entry into each succeeding catalyst bed. In a multiple bed essentially adiabatic reaction system, a plurality of fixed beds containing the reforming catalyst can be arranged for serial flow of the feedstock and in such a manner that the beds can be removed from the processing cycle, usually one at a time, and the catalyst regenerated without a break in the continuity of operation. Subsequently the regenerated bed can be placed on stream with another bed being removed to undergo regeneration in like manner. This procedure is particularly applicable to catalyst beds or reactors subsequent in line to the initial reactor, preferably the terminal reactor, in order to extend the length of the processing cycle since the catalyst in a subsequent reactor is more quickly deactivated than that in the preceding reactor. This deactivation is due to the maintenance of a higher average temperature in the subsequent reactor catalyst bed.

As a result the catalyst in each succeeding reactor will become partially deactivated in less time than the catalyst of the preceding reactor and in order to insure a high grade reformate the catalyst in the reactors is periodically regenerated. This can be accomplished in a multiple bed system by, for instance, blocking out a reactor, which may be a so-called swing reactor, while the remaining reactors are continued in their normal processing cycle. The blocked out reactor, in order to regenerate the catalyst contained therein, can be depressured and purged with an inert gas. After purging, a flow of free oxygen-containing regeneration gas is established, and regeneration initiated. The reeneration can be conducted at a temperature in the range of about 700 to 950° F. with the final stage being conducted at about 850° to 950° F. When the activity of the catalyst has been restored, i.e., when the predominant portion of the carbon deposits is burned off, the oxygen flow is stopped and the inert gas flow started. The system can then be depressured and evacuated several times in order to insure complete oxygen removal. Prior to placing the reactor on stream again, it is pressured with a hydrogen-containing gas from the recycle system and when operating pressures have been attained the block valves are opened, placing the unit in the reforming cycle. Subsequently, another reactor can be treated in substantially the same manner.

The current trend in the operation of reforming units is to increase the severity levels for the production of reformates with clear octanes of about 100 RON or higher. Reforming of highly paraffinic charge stocks, such as those containing at least about 50% by volume of paraffins, to produce clear octanes of 100 RON requires severity levels even higher than those required to reform low paraffin content charge stocks. High severity reforming conditions include temperatures of about 900° to 990° F. and pressures of about 100 to 400 p.s.i.g. Lower pressures are employed in high severity reforming primarily because dehydrocyclization of paraffins to aromatics increases with decreasing pressure and yield advantages often outweigh other factors. Low pressure operation is disadvantageous, however, since catalyst deactivation is much more rapid and frequent regeneration is therefore required, and also due to the required increase in size or capacity of the equipment associated with the reactors in the reforming system, such as the recycle lines and recycle gas compressors, which would have to be installed in modifying an existing unit or building a new one.

My copending application Serial No. 125,994 describes a processing sequence wherein the advantages of low pressure operation in terms of higher yields of high clear octane number product are obtained at high pressures, particularly when reforming a highly paraffinic charge stock containing at least about 50% by volume of paraffins.

The application is based on the finding that when operating a reforming reaction system at relatively high pressures but with a hydrogen partial pressure corresponding generally to that of a conventional low pressure operation, the balance of the pressuring gases being essentially a mixture of $C_1$ to $C_3$ alkanes, the yield-octane relationship is comparable if not improved, the reformate lead susceptibilities are improved, catalyst deactivation is less rapid and there is an increased net hydrogen make over conventional low pressure operation. These and other advantages are accomplished by carrying out the reforming processing operation under high severity conditions otherwise conventional but at a total pressure of about 300 to 1000 p.s.i.g., the gas introduced into the reforming reaction system other than hydrocarbon charge stock consisting essentially of hydrogen and at least one $C_1$ to $C_3$ alkane and the mole percent hydrogen in the gas so introduced multiplied by the total pressure of the gas so introduced being maintained on the hydrogen-rich side of the methane decomposition equilibrium but at least about 1% less than the partial pressure of the hydrogen in the hydrogen-containing recycle fraction of the effluent from the reaction system. Advantageously the hydrogen partial pressure in the hydrogen-containing recycle gas stream is maintained within the range of about 100 to 350 p.s.i.g. with a hydrocarbon partial pressure in the recycle gas stream higher than at least about 40% of the hydrogen partial pressure.

One of the methods disclosed in Serial No. 125,994 for adjusting the hydrogen content of the recycle gas stream is by separating from the reforming reaction effluent a fraction consisting essentially of hydrogen and at least one $C_1$ to $C_3$ alkane, separating substantially pure hydrogen from at least a portion of the so-separated fraction, and recycling the fraction so enriched in alkane content to the reforming reaction system. The latter separation can be accomplished, for example, by passing the fraction consisting essentially of hydrogen and at least one $C_1$ to $C_3$ alkane into a palladium type diffuser. Such a diffuser can comprise a bank of jacketed palladium or palladium alloy tubes connected in parallel and heated to a temperature of about 750° F. Substantially pure hydrogen passes through the palladium tubes into the jacketed section and is withdrawn, so that by this method it is possible to produce essentially pure hydrogen.

The present invention resides in the application and extension of the findings of Serial No. 125,994 to reforming of light hydrocarbon stocks containing a substantial volume of paraffinic and naphthenic hydrocarbons in a reforming reaction system including successive serially connected reaction zones.

In reforming a conventional light hydrocarbon charge stock containing substantial quantities of paraffins and naphthenes in a multiple bed essentially adiabatic reaction system, the rate of aromatics formation by dehydrogenation of naphthenes is more rapid than the rate of aromatics formation by dehydrocyclization of paraffins so that the effluent from the first reactor in the system seldom contains more than 10% to 20% by volume of naphthenes even when the light hydrocarbon charge stock introduced into the first reactor contains up to about 60% by volume of naphthenes. Moreover, the predominant reaction in the first one or two reactors in the system, due primarily to the lower catalyst bed temperatures, is dehydrogenation of naphthenes to aromatics with a concomitant substantially large net hydrogen production, depending upon the volume percent of naphthenes in the naphtha hydrocarbon charge stock. Even with low naphthene content charge stocks, the increased extent of dehydrocyclization of paraffins to aromatics, when operating in accordance with this invention, produces sufficient hydrogen to more than offset hydrogen consumption due to hydrocracking, so that the net hydrogen produced by the reforming reaction system is at least 250 standard cubic feet of hydrogen per barrel of charge stock.

In accordance with the present invention, the reforming reaction system can be operated in a variety of ways to provide low hydrogen partial pressures in all or a selected number of the reaction zones in a multiple bed catalytic reforming system, including adding to the reforming reaction system a gas fraction enriched in $C_1$ to $C_3$ alkane, withdrawing from the reforming reaction system a gas fraction enriched in hydrogen, or by a combination of such steps, and for illustrative purposes, reference will be made to the accompanying drawing, FIGURE 1 of which represents in schematic form a reforming reaction system and wherein FIGURE 2 represents a palladium diffuser comprising a bank of jacketed palladium or palladium alloy tubes connected in parallel and heated to a temperature of about 750° F. In FIGURE 1, numeral 1 designates a feed line by way of which a preheated naphtha boiling in the range of about 150° to 400° F. is introduced into gas-fired preheater 2. The naphtha is heated to a suitable inlet temperature, i.e., about 915° F., and then is passed by way of line 3 to reforming reactor 4 containing a bed of a platinum on alumina type catalyst. Effluent from reactor 4 is passed to reheater 6 by way of line 5, wherein it is heated to a temperature of about 920° F., and then to reactor 8 by way of line 7. Effluent from reactor 8 is passed to reheater 10 by way of line 9, wherein it is heated to a temperature of about 925° F., and then to reactor 12 by way of line 11. Effluent from reactor 12 is passed by way of line 13 to reheater 14, wherein it is heated to a temperature of about 925° F., and then to reactor 16 by way of line 15. Effluent from reactor 16 is passed by way of line 17 to separator 18 from which gaseous products consisting essentially of hydrogen and $C_1$ to $C_3$ alkanes are withdrawn by way of line 19. Liquid product is withdrawn from separator 18 by way of line 20 and passed to distillation zone 21 which is shown as a single distillation tower but can be associated with a depropanizer or a debutanizer or both. Dissolved $C_1$ to $C_3$ alkanes are withdrawn from distillation zone 21 by way of line 22, dissolved $C_4$ alkanes are withdrawn by way of line 23 and $C_5^+$ reformate is withdrawn by way of line 24. Hydrogen containing gas withdrawn from separator 18 by way of line 19 is recycled to reactor 1 by way of lines 25 and 3, make gas being removed by line 26, and start-up hydrogen being supplied by line 27.

FIGURE 2 shows a palladium diffuser 35 in schematic form and the dash lines in FIGURE 1 indicate the points at which the diffuser can be placed in the reforming reaction system shown in FIGURE 1. Also, dash lines 28, 29, 30 and 31 indicate the points at which $C_1$ to $C_3$ alkanes can be introduced into the reforming reaction system shown in FIGURE 1.

The data presented in copending application Serial No. 125,944 and subsequently herein show that low hydrogen partial pressure operation is especially advantageous for highly paraffinic charge stocks. Thus, where the charge stock is derived from a Middle East crude and has a paraffin content of the order of 65–75 volume percent and a naphthene content of the order of 15–22 volume percent, then a relatively small capacity palladium diffuser can be installed in recycle gas line 25. Such an installation would require reheating of the recycle gas so that depending upon the amount of feed charged to the unit, economics may dictate placing the palladium diffuser in line 17. Where the charge stock is of intermediate naphthene content, i.e., 25–35 volume percent, the diffuser is with advantage placed in line 7 after the first reactor and reheater since at this point in the reforming reaction system hydrogen production is substantially large and removal of a substantial amount of this hydrogen make promotes paraffin dehydrocyclization in the subsequent reactors under conditions of low hydrogen partial pressure. With higher naphthene content feeds, the diffuser is with advantage placed in line 11 after the second reactor and reheater since naphthene dehydrogenation is substantially complete at this point in the system. With low paraffin, high naphthene content charge stocks, and where the octane number requirement imposed upon the reforming reaction system is of the order or 95 to 100 or more, the diffuser can with advantage be placed in line 15 after the third reactor and reheater. The amount of hydrogen withdrawn from the system by means of one or more palladium type diffusers, wherever placed, is at least 250 standard cubic feet of hydrogen per barrel of charge stock and can range up to the total net hydrogen make of the reforming reaction system. Since the reforming reaction system also produces a net $C_1$ to $C_3$ alkane make, withdrawal of hydrogen from any point in the system will result in a reduced hydrogen partial pressure for the recycle gas stream.

In like manner, $C_1$ to $C_3$ alkanes can be introduced into the reforming reaction system by means of any of lines 28, 29, 30 and 31 to adjust the hydrogen partial pressure in the reforming reaction system, or a combination of $C_1$ to $C_3$ alkane introduction and hydrogen withdrawal can be employed.

If a diffusion unit is used such that a small amount of hydrogen is withdrawn relative to the unit's diffusion capacity, then the hydrogen on the effluent (pure hydrogen) side of the diffusion unit will be essentially in equilibrium with the hydrogen in the gas stream passing through the diffuser. Thus a diffusion unit can be used to measure the partial pressure of the hydrogen in the recycle or processing gas stream. Other means, such as the use of a hydrogen analyzer, may also be used to measure the partial pressure of the hydrogen in these streams. In response to this measurement, varying the rate of hydrogen withdrawal from the reformer permits control of the partial pressure of the hydrogen in the gas stream. These convenient means of controlling hydrogen content and hydrogen partial pressure in the recycle or processing gas streams provide an additional operating variable affecting product yield and octane as well as catalyst life.

Alternatively, hydrogen can be separated from the recycle fraction consisting essentially of hydrogen and at least one $C_1$ to $C_3$ alkane by other means known to the art as by preferential absorption of the alkane in a liquid hydrocarbon in an absorption-desorption system or by low temperature fractionation.

In addition, operation of the reforming reaction system with a high $C_1$ to $C_3$ alkane content recycle gas stream together with a high recycle ratio of about 20 moles of hydrogen per mole of feed or higher permits the use of fewer reactors and/or reheaters in the reaction system due to the increased heat capacity of the recycle gas stream.

The high severity reaction conditions employed are those which produce a reformate having an octane number clear of at least about 90 or preferably at least about 100 RON or more and generally fall within the following ranges: temperature, about 875° F. to 990° F., preferably at least about 920° F.; pressures, about 300 to 1000 p.s.i.g., preferably about 300 to 500 p.s.i.g.; recycle gas ratios of about 3 to 50 moles of hydrogen per mole of hydrocarbon feed; and space velocity, about 1 to 20 WHSV. The catalysts employed are the platinum group metal reforming catalysts. Generally these comprise about 0.1 to 2.0% by weight of a platinum group metal component on an alumina base. Such catalysts can include promoters. The platinum group metal of the catalyst is the essential component and these metals include for instance platinum, rhodium, palladium and iridium.

The feeds employed are the conventional petroleum reforming stocks boiling in the naphtha range, i.e. about 140° to 400° F., which contain about 20 to 95 volume percent of paraffins, preferably about 40 to 75 volume percent of paraffins, since the advantages of the invention are more significant the higher the proportion of paraffins in the charge stock. The proportion of naphthenes in the charge stock is not critical and can range up to about 60% by volume. Typical of these high paraffin content charge stocks are those whose inspections are set out below:

|  | Middle East | Kuwait | Mid-Continent |
|---|---|---|---|
| Gravity, ° API | 54.5 | 58.2 | 55.5 |
| ASTM dist., ° F.: |  |  |  |
| I.B.P | 272 | 215 | 206 |
| 10% | 282 | 232 | 237 |
| 50 | 300 | 264 | 274 |
| 90 | 342 | 318 | 324 |
| E.P | 378 | 349 | 361 |
| Sulfur, wt. percent | 0.03 | 0.04 | 0.03 |
| Paraffins, vol. percent | 66 | 64 | 50 |
| Naphthenes, vol. percent | 20 | 23 | 41.5 |
| Aromatics, vol. percent | 14 | 13 | 8.5 |

Also, the charge stock most advantageously is substantially free from water and materials which would produce water in the reaction zone so that the water and sulfur content of the total feed including recycle gas and hydrocarbon charge stock entering the reaction system at all times during hydrocarbon charge stock introduction to the system are maintained below about 150 parts of water per million parts by volume of total feed in vapor phase and 25 parts of sulfur per million parts by weight of total feed, and the water and sulfur content of the effluent withdrawn from the reforming reaction system at all times during hydrocarbon charge stock introduction to the system are maintained below about 100 parts of water per million parts by volume of total effluent in vapor phase and 25 parts of sulfur per million parts by weight of total effluent.

The advantages of reforming in accordance with the present invention are most pronounced when the catalyst has not been damaged by simultaneous contact of water and a hydrocarbon containing gas with a virgin or freshly regenerated catalyst at high temperatures of the order of 850° to 1100° F. and higher prior to or during a processing cycle as is described in my copending application Serial No. 125,992, filed July 24, 1961. Thus as described in that application, the virgin or freshly regenerated catalyst is preferably reduced using hydrocarbon free hydrogen and if a hydrogen containing gas also containing hydrocarbons is employed to reduce the catalyst, then the water content of the effluent withdrawn from the reforming reaction system at all times during catalyst reduction is maintained below about 100 parts of water per million parts by volume of total effluent in vapor phase.

The operation of a multiple bed reforming reaction system employing a charge stock containing a substantial volume percent of both paraffinic and naphthenic hydrocarbons is most advantageously carried out in accordance with this invention by employing a relatively low recycle ratio in the first reactor of about 2 to 8 moles of hydrogen per mole of hydrocarbon charge stock and introducing additional hydrogen containing gas into the reforming reaction system at a point subsequent to the first reaction zone wherein the volume ratio of paraffin to naphthenic hydrocarbons in the partially converted charge stock is greater than 5:3 in an amount sufficient to provide an increased ratio of about 10 to 50 moles of hydrogen per mole of hydrocarbon charge stock as is described in my copending application Serial No. 136,788, filed of even date herewith now abandoned. Thus, for example, when operating at a recycle ratio of 20 moles of hydrogen per mole of hydrocarbon charge stock, the recycle gas stream passing through line 25 of the drawing is split with about 20 mole percent being introduced into the first reactor 4 and the remaining 80 mole percent being introduced into line 11 along with the feed to the third reactor 12, a palladium diffuser being installed in line 11 prior to the point of entry of the recycle gas.

The process of this invention is illustrated in detail in the following examples:

EXAMPLE 1

A fluoride-free platinum-alumina catalyst produced in a commercial plant which manufactures the catalyst of U.S. Patent 2,838,444 containing approximately 0.6 weight percent platinum in the form of one-sixteenth inch extrudates in an amount of 20 grams was placed in a one inch inside diameter Universal stainless steel reactor tube dispersed with sufficient 8 to 14 mesh tabular alumina to provide a catalyst zone of about 250 cubic centimeters volume. The reactor, after each charging, was placed in a bronze-block furnace controlled by thermostats. Bed temperatures were measured by means of platinum and platinum-rhodium thermocouples. Each charge of catalyst was purged with nitrogen gas and then reduced overnight in a slow stream of hydrogen gas at about 900° F. and atmospheric pressure. The mixture of feed and recycle gas passed over the catalyst through the bed and the effluent was passed to a small volume high pressure separator from the top of which a gas phase was taken off for recycle and from the bottom of which a net product consisting of condensable liquid plus the net gas production was withdrawn and introduced into a product stabilizer. In order to minimize both holdup and flow upsets in the small volume system, the total net product was continuously removed using an air-operated flow control valve actuated by a back pressure record-controller. The total net product was fed continuously into a product stabilizer to give a $C_5^+$ liquid product and a $C_4^-$ gas. The gas from the stabilizer was metered and then sampled by diverting a portion into an evacuated butyl rubber gas sample bag using a timer actuated solenoid valve. The recycle gas was passed through an Ascarite scrubber and dryer for removal of water and acidic materials such as hydrogen sulfide. The feed system was a conventional pressure drop system including an alumina dryer. The feed was measured volumetrically. The feed and recycle gas dryers reduced the water content of the total feed to the unit to less than 100 parts of water per million parts by volume of total feed in vapor phase and the Ascarite scrubber substantially completely removed any sulfur from the recycle gas. The unit has proved suitable for accurately determining yield-octane relationships.

The feed charged to the unit was a highly paraffinic naphtha obtained by Udex extraction of a $C_8$ reformate fraction and had the folowing inspections:

ASTM Dist. °F.:
| | |
|---|---|
| Initial B.P. | 246 |
| 5% | 251 |
| 10% | 252 |
| 20% | 254 |
| 30% | 256 |
| 40% | 258 |
| 50% | 260 |
| 60% | 262 |
| 70% | 264 |
| 80% | 269 |
| 90% | 277 |
| 95% | 286 |
| E.P. | 328 |
| Sulfur, p.p.m. | 7.4 |
| Density 60/60 | .716 |
| Paraffins, vol. percent | 92 |
| Naphthenes, vol. percent | 0 |
| Aromatics, vol. percent | 8 |
| Aniline Point, °F. | 156.6 |

The operating conditions, yield and product inspection data are shown in the following Table I. Except where noted, recoveries exceed 97% (most over 98%) and yields are given as the percent on feed and were calculated on the basis of 100% recovery.

Analysis of both gas and liquid samples for $C_1$ through $C_5$ hydrocarbons was by gas chromatography. Analysis of gas samples for hydrogen was by Orsat. All components of a gas sample were determined independently and then summed as a check against errors. All gas analyses were converted to an air-free basis before use in yield calculations.

The system was pressured with hydrogen and during the sixth to twenty-ninth hours of the run, the unit was operated at a recycle ratio of 7:1 and a total pressure of 350 p.s.i.g. During the hours 29–36, the recycle ratio was increased to 55:1 with a consequent drop in product octane. During hours 43–50 and following, methane analyzing 95.5 mol percent methane and 1.8 mol percent hydrogen was introduced into the recycle stream and the total pressure and recycle ratio were increased so that the total amounts of hydrogen in the recycle gas would approximate those during the initial portion of the run, i.e., hours 6–29. The run demonstrates that the product octane number remained substantially the same when operating at 600 p.s.i.g. with a high proportion of methane in the recycle gas, as when operating normally with a predominantly hydrogen recycle gas at 350 p.s.i.g. During the initial operations with methane, i.e. during hours 43–50, the mole percent of hydrogen in the recycle gas is estimated to be approximately 60%. As methane introduction continues, however, the mole percent of hydrogen decreases. Thus, to avoid decline in catalyst activity and to achieve the benefits of this invention with respect to high octane number product at high pressure operation, the mole percent of hydrogen in the recycle gas introduced into the reforming system multiplied by the total pressure of the gas so introduced is maintained on the hydrogen-rich side of the methane decomposition equilibrium but at least about 1% less than the partial pressure of the hydrogen in the hydrogen-containing recycle fraction of the effluent from the reaction system.

The methane decomposition equilibrium varies for any given set of reaction conditions but can be calculated for a given set of conditions. Higher rates of catalyst deactivation at the methane decomposition equilibrium point, however, indicate operation on the hydrogen excess side of the methane decomposition equilibrium. The pertinent data appear in the following Table I.

TABLE I
[Run No. 1369]

| Operating Conditions: | | | | | | | | | | | |
|---|---|---|---|---|---|---|---|---|---|---|---|
| Hours on Oil, grams | 6–13 | 13–19 | 19–26 | 29–36 | 43–50 | 53–61 | 64–72 | 72–80 | 80–88 | 90–98 | 98–106 |
| Methane Addition (per 100 grams feed) | | | | | 25 | 26 | 39 | 38 | 38 | 25 | 27 |
| Temp.° F | 895.2 | 895.4 | 895.5 | 895.0 | 885.4 | 895.1 | 896.5 | 895.6 | 895.6 | 895.6 | 895.1 |
| Press., p.s.i.g | 350 | 350 | 350 | 350 | 600 | 600 | 600 | 600 | 600 | 600 | 600 |
| WHSV | 2.0 | 2.0 | 2.0 | 2.0 | 2.0 | 2.0 | 2.0 | 2.0 | 2.0 | 2.0 | 2.0 |
| Recycle Ratio | 7.0 | 7.0 | 7.0 | 55.0 | 10.0 | 10.0 | 10.0 | 10.0 | 10.0 | 10.0 | 10.0 |
| Yield Based on 100% Recovery: | | | | | | | | | | | |
| H₂, wt. percent | 1.6 | | 1.5 | 1.3 | 3.3 | 4.0 | 2.4 | 2.7 | 2.1 | 1.4 | 1.2 |
| C₁–C₄, wt. precent | 28.3 | | 27.5 | 16.9 | 31.3 | 31.1 | 25.9 | 25.3 | 22.3 | 21.6 | 21.4 |
| C₅⁺, wt. percent | 70.1 | | 71.0 | 81.9 | 75.7 | | 72.1 | 77.4 | 76.6 | 77.0 | 77.4 |
| C₅⁺, vol. percent | 65.4 | | 66.4 | 78.5 | 69.6 | | 65.0 | 70.9 | 70.7 | 72.6 | 73.1 |
| C₁, wt. percent | 2.5 | | 2.3 | 1.8 | 10.3 | 10.3 | 0.4 | 5.4 | 1.0 | 2.0 | 1.9 |
| C₂, wt. percent | 4.8 | | 4.8 | 3.1 | 6.8 | 6.6 | 5.5 | 5.5 | 5.2 | 4.5 | 4.2 |
| C₃, wt. percent | 10.4 | | 10.1 | 6.2 | 11.8 | 12.3 | 10.4 | 10.1 | 8.1 | 7.4 | 7.3 |
| C₄, wt. percent | 10.6 | | 10.3 | 5.7 | 12.7 | 12.1 | 10.1 | 9.7 | 9.0 | 7.7 | 8.3 |
| Aromatics, vol. percent on Feed | 34 | | 36 | 28 | 37 | 37 | 37 | 38 | 34 | 28 | 30 |
| Product Inspections: | | | | | | | | | | | |
| Density, 60/60 | 0.770 | 0.767 | 0.768 | 0.749 | 0.781 | 0.782 | 0.796 | 0.784 | 0.778 | 0.762 | 0.760 |
| Aniline Point | 108.0 | 110.0 | 111.6 | 128.1 | 110.5 | 107.8 | 106.1 | 111.7 | 118.4 | 126.0 | 126.7 |
| Aromatics, vol. percent | 55 | 52 | 51 | 36 | 53 | 58 | 57 | 53 | 48 | 39 | 42 |
| RON: | | | | | | | | | | | |
| Clear | 92.8 | 91.5 | 90.8 | 75.1 | 89.1 | 91.2 | 91.0 | 88.0 | 83.8 | 75.7 | 75.3 |
| +3 ml | 102.4 | 99.2 | 99.4 | 90.3 | 99.3 | 99.3 | 99.0 | 96.7 | 94.0 | 91.1 | 90.3 |

EXAMPLE 2

The effect of methane addition to the recycle gas on the dehydrocyclization reaction, particularly using a high recycle ratio and a low sulfur feed is demonstrated by the data in this example.

The same apparatus was employed as in Example 1. The catalyst was similar to that of Example 1 except that it contained 0.9% by weight of platinum. The feed was the same as that used in Example 1 except that it had been sodium desulfurized. The feed inspections were as follows:

ASTM Dist. ° F.:
- Initial B.P. _____ 250
- 5% _____ 252
- 10% _____ 253
- 20% _____ 254
- 30% _____ 255
- 40% _____ 256
- 50% _____ 258
- 60% _____ 260
- 70% _____ 263
- 80% _____ 267
- 90% _____ 277
- 95% _____ 284
- E.P. _____ 302
- Sulfur, p.p.m. _____ 1.3
- Density 60/60 _____ .714
- Aromatics, vol. percent _____ 7
- Paraffins, vol. percent _____ 93
- Aniline Point, ° F. _____ 156.9

The pertinent data appear in the following Table II wherein it can be seen from the aromatics content and RUN 1351
[895° F., 55/1 Recycle]

|  | No $C_1$ |  | $C_1$ Added (2 Mols/100 g. Feed) |  | No $C_1$ |
|---|---|---|---|---|---|
| Hrs. on Oil | 9/16 | 23/30 | *33/40 | *47/54 | 63/70 |
| RON | 97.0 | 95.9 | 101.4 | 100.0 | 86.0 |
| Vol. Percent $C_5^+$ |  |  |  |  |  |
| Input Basis | 60.0 | 62.6 | 59.2 | 60.5 | ------ |
| Output Basis | 62.5 | 64.0 | 70.8 | 76.3 | 73 |

*Poor recoveries.

Thirdly, even though the octane level is increased, yields are at least as good as without methane.

EXAMPLE 3

The effect of hydrogen withdrawal from the recycle gas stream is demonstrated by the data in this example. The apparatus was the same as that employed in Example 1 except that the gas phase from the top of the high pressure separator was passed into a palladium diffusion unit prior to recycle. The diffusion unit comprised a jacketed palladium tube of one-eighth inch outside diameter approximately two feet long. A pressure gauge indicated the pressure of the through gas after leaving the diffusion unit and a separate pressure gauge indicated the pressure of the substantially pure hydrogen in the jacketed section of the diffusion unit. Substantially pure hydrogen was bled from the jacketed section at controlled rates.

The catalyst was the same as that employed in Example 1 and the feed was a straight run naphtha having the following inspections:

TABLE II
[Run No. 1351]

| Operating Conditions: | | | | | | | | | | | |
|---|---|---|---|---|---|---|---|---|---|---|---|
| Hours on Oil, grams | 9-16 | 16-23 | 23-30 | 33-40 | 40-47 | 47-54 | 54-60 | 63-70 | 70-77 | 82-89 | 89-96 |
| Methane Addition (per 100 grams feed) | ---- | ---- | ---- | 29 | 29 | 30 | 34 | ---- | ---- | ---- | ---- |
| Temp., ° F | 895.8 | 895.8 | 895.8 | 895.1 | 896.0 | 895.5 | 896.0 | 895.6 | 895.4 | 896.0 | 895.1 |
| Press., p.s.i.g | 350 | 350 | 350 | 350 | 350 | 350 | 350 | 350 | 350 | 350 | 350 |
| WHSV | 2.0 | 2.0 | 2.0 | 2.0 | 2.0 | 2.0 | 2.0 | 2.0 | 2.0 | 2.0 | 2.0 |
| Recycle Ratio | 55.0 | 55.0 | 55.0 | 54.0 | 55.0 | 55.0 | 55.0 | 55.0 | 55.0 | 55.0 | 55.0 |
| Yield Based on 100% Recovery: | | | | | | | | | | | |
| $H_2$, wt. percent | 2.3 | 2.2 | 2.2 | 5.6 | 5.4 | 6.3 | 5.0 | 1.8 | 1.8 | 1.8 | 1.7 |
| $C_1$-$C_4$, wt. percent | 28.5 | 27.3 | 24.7 | 22.0 | 21.0 | 21.6 | 21.1 | 20.5 | 20.3 | 20.8 | 19.9 |
| $C_5^+$, wt. percent | 69.2 | 70.5 | 72.3 | 81.6 | 79.4 | 86.8 | 85.8 | 77.8 | 77.8 | 77.4 | 78.3 |
| $C_5^+$, vol. percent | 62.5 | 64.0 | 65.5 | 70.8 | 69.3 | 76.3 | 75.6 | 73.9 | 73.9 | 72.0 | 72.9 |
| $C_1$, wt. percent | 4.2 | 3.9 | 3.4 | -9.3 | -5.9 | -14.8 | -11.9 | 2.4 | 2.4 | 2.6 | 2.6 |
| $C_2$, wt. percent | 6.1 | 5.8 | 5.2 | 5.9 | 5.4 | 5.7 | 5.4 | 3.6 | 3.5 | 3.9 | 3.8 |
| $C_3$, wt. percent | 10.1 | 9.7 | 8.8 | 8.2 | 7.9 | 8.4 | 8.1 | 7.5 | 7.8 | 7.6 | 7.3 |
| $C_4$, wt. percent | 8.1 | 8.0 | 7.3 | 7.9 | 7.6 | 9.2 | 7.5 | 7.0 | 6.6 | 6.7 | 6.3 |
| Aromatics, vol. percent on Feed | 41 | 42 | 42 | 56 | 54 | 56 | 55 | 34 | 34 | 34 | 34 |
| Product Inspections: | | | | | | | | | | | |
| Density, 60/60 | 0.795 | 0.790 | 0.792 | 0.828 | 0.822 | 0.816 | 0.815 | 0.765 | 0.756 | 0.772 | 0.771 |
| Aniline Point, ° F | 94.1 | 95.3 | 96.8 | 82.8 | 85.6 | 88.1 | ---- | 115.5 | 117.3 | 115.9 | 117.0 |
| Aromatics, vol. percent | 65 | 65 | 64 | 79 | 78 | 78 | 73.0 | 47 | 46 | 46 | 46 |
| RON: | | | | | | | | | | | |
| Clear | 97.0 | 96.7 | 95.7 | 101.4 | 101.1 | 100.0 | 99.0 | 86.0 | 85.3 | 85.0 | 85.0 |
| +3 ml | 102.6 | 102.4 | 101.9 | 104.7 | 104.6 | 103.9 | 103.3 | 96.0 | 95.4 | 95.8 | 95.4 | product octane number that methane introduction into the recycle gas markedly promoted the dehydrocyclization reaction even when operating at 350 p.s.i.g.

In the data presented in Tables I and II, during methane addition, recoveries were between 93% and 94% and the yields were calculated from the combined input of feed and methane. In view of the poor recoveries in these tests, it is impossible to interpret the yield data unambiguously. However, certain facts stand out. First, addition of methane results in much higher product octanes than would otherwise be obtained at a given temperature. Secondly, catalyst decline rate is not too greatly increased over that with no addition.

ASTM Dist. ° F.:
- Initial B.P. _____ 221
- 10% _____ 248
- 30% _____ 269
- 50% _____ 292
- 70% _____ 314
- 90% _____ 342
- E.P. _____ 370
- Sulphur, p.p.m. _____ 90
- Density, 60° F. _____ 0.757
- Paraffins, vol. percent _____ 45
- Naphthenes, vol. percent _____ 45
- Aromatics, vol. percent _____ 10

The operating conditions, yield and product inspection data are shown in the following Table III. The data show a significant increase in both liquid yield and product octane as hydrogen is withdrawn from the recycle gas stream and the partial pressure of hydrogen in the recycle gas stream is lowered. Also, the composition of the make gas is altered showing a significant increase in hydrogen production and decrease in methane production.

During hours 140–160, the gas samples were discarded due to rupture of the diffusion unit. After 215 hours the catalyst was regenerated at 850° F. and 400 p.s.i.g. using regeneration gas having 0.7% oxygen content.

TABLE III
[Run No. 1707]

| | | | | | | | | |
|---|---|---|---|---|---|---|---|---|
| Operating Conditions: | | | | | | | | |
| Hours on Oil | 6–12 | 12–18 | 25–31 | 31–36 | 36–41 | 44–51 | 59–65 | 65–71 |
| Temp., °F | 895.5 | 894.9 | 894.7 | 895.3 | 895.3 | 925.7 | 894.8 | 893.8 |
| WHSV | 2.0 | 2.0 | 2.0 | 2.0 | 2.0 | 2.0 | 2.0 | 2.0 |
| Recycle Ratio, mol/mol: | | | | | | | | |
| Total Gas | 7.0 | 7.0 | 7.0 | 7.0 | 7.0 | 7.0 | 7.0 | 7.0 |
| Hydrogen | 5.9 | 6.0 | 4.2 | 3.9 | 3.6 | 3.3 | 4.7 | 4.3 |
| Press., p.s.i.g.: | | | | | | | | |
| Total | 500 | 500 | 500 | 500 | 500 | 500 | 500 | 500 |
| Hydrogen (diffusion unit) | 420 | 428 | 298 | 281 | 261 | 238 | 338 | 309 |
| Hydrogen Bleed Rate, mol/mol feed | | | 1.0 | 1.1 | 1.2 | 1.1 | 1.2 | 1.2 |
| Yield Based on 100% Recovery: | | | | | | | | |
| $H_2$, wt. percent | 1.7 | 1.7 | 2.0 | 2.6 | 2.5 | 2.2 | 2.1 | 3.4 |
| $C_1$–$C_4$, wt. percent | 16.4 | 17.0 | 14.2 | 13.9 | 13.7 | 19.6 | 9.7 | 10.4 |
| $C_5^+$, wt. percent | 82.0 | 81.4 | 83.8 | 83.5 | 84.0 | 78.3 | 88.2 | 86.2 |
| $C_5^+$, vol. percent | 78.1 | 77.2 | 79.2 | 70.0 | 79.2 | 72.0 | 84.1 | 82.0 |
| $C_1$, wt. percent | 2.0 | 2.0 | 1.1 | 1.2 | 1.2 | 2.2 | 0.6 | 0.8 |
| $C_2$, wt. percent | 3.3 | 3.7 | 3.2 | 2.9 | 3.1 | 4.5 | 1.9 | 2.5 |
| $C_3$, wt. percent | 6.0 | 6.2 | 5.7 | 5.8 | 5.4 | 7.0 | 5.1 | 4.5 |
| $iC_4$, wt. percent | 2.3 | 2.3 | 2.1 | 1.9 | 2.0 | 2.7 | 1.6 | 1.5 |
| $nC_4$, wt. percent | 2.8 | 2.8 | 2.1 | 2.1 | 2.0 | 3.2 | 1.5 | 1.1 |
| Aromatics, vol. percent on Feed | 48 | 47 | 50 | 50 | 50 | 54 | 49 | 48 |
| Product Inspections: | | | | | | | | |
| Density, 60/60 | 0.799 | 0.801 | 0.804 | 0.804 | 0.806 | 0.826 | 0.797 | 0.799 |
| Aniline pt., °F | 101.1 | 101.5 | 97.9 | 97.5 | 96.4 | 84.6 | 103.6 | 102.2 |
| Aromatics, vol. percent | 60 | 60 | 63 | 63 | 63 | 75 | 58 | 59 |
| RON: | | | | | | | | |
| Clear | 93.0 | 93.0 | 95.0 | 95.5 | 95.8 | 100.8 | 91.3 | 92.6 |
| +3 ml | 99.8 | 99.9 | 101.6 | 101.7 | 101.8 | 113.7 | 98.6 | 99.9 |
| Operating Conditions: | | | | | | | | |
| Hours on Oil | 74–81 | 81–88 | 88–95 | 95–102 | 104–110 | 110–116 | 124–130 | 130–136 |
| Temp., °F | 925.2 | 924.6 | 924.8 | 925.7 | 925.7 | 924.8 | 894.7 | 895.6 |
| WHSV | 2.0 | 2.0 | 2.0 | 2.0 | 2.0 | 2.0 | 2.0 | 2.0 |
| Recycle Ratio, mol/mol: | | | | | | | | |
| Total Gas | 7.0 | 7.0 | 7.0 | 7.0 | 7.0 | 7.0 | 7.0 | 7.0 |
| Hydrogen | 3.7 | 3.7 | 3.6 | 3.5 | 3.5 | 3.4 | 5.5 | 5.5 |
| Press., p.s.i.g.: | | | | | | | | |
| Total | 500 | 500 | 500 | 500 | 500 | 500 | 500 | 500 |
| Hydrogen (diffusion unit) | 267 | 263 | 255 | 252 | 248 | 245 | 396 | 390 |
| Hydrogen Bleed Rate, mol/mol feed | 1.2 | 1.2 | 1.2 | 1.3 | 1.2 | 1.2 | 1.2 | 1.2 |
| Yield Based on 100% Recovery: | | | | | | | | |
| $H_2$, wt. percent | 2.3 | 2.2 | 2.2 | 2.3 | 2.2 | 2.2 | 2.0 | 2.2 |
| $C_1$–$C_4$, wt. percent | 15.1 | 17.9 | 17.0 | 15.2 | 17.4 | 16.4 | 7.8 | 7.8 |
| $C_5^+$, wt. percent | 82.6 | 79.9 | 81.0 | 82.5 | 80.4 | 81.4 | 90.4 | 90.0 |
| $C_5^+$, vol. percent | 77.5 | 74.1 | 75.5 | 76.9 | 74.6 | 75.9 | 86.6 | 86.3 |
| $C_1$, wt. percent | 1.6 | 1.9 | 2.0 | 1.7 | 1.9 | 1.9 | 0.4 | 0.4 |
| $C_2$, wt. percent | 3.8 | 4.1 | 4.2 | 3.8 | 4.1 | 4.1 | 1.7 | 1.8 |
| $C_3$, wt. percent | 6.4 | 6.5 | 6.5 | 5.8 | 6.4 | 6.1 | 3.4 | 3.3 |
| $iC_4$, wt. percent | 1.7 | 2.5 | 2.3 | 2.1 | 2.4 | 2.1 | 1.3 | 1.2 |
| $nC_4$, wt. percent | 1.6 | 2.9 | 2.0 | 1.8 | 2.6 | 2.2 | 1.0 | 1.1 |
| Aromatics, vol. percent on Feed | 55 | 54 | 54 | 55 | 54 | 54 | 48 | 47 |
| Product Inspections: | | | | | | | | |
| Density, 60/60 | 0.811 | 0.821 | 0.817 | 0.817 | 0.820 | 0.817 | 0.794 | 0.794 |
| Aniline pt., °F | 900 | 86.1 | 88.9 | 89.6 | 86.4 | 88.9 | 107.6 | 110.1 |
| Aromatics, vol. percent | 71 | 73 | 71 | 71 | 73 | 71 | 55 | 55 |
| RON: | | | | | | | | |
| Clear | 100.4 | 100.3 | 100.0 | 99.5 | 99.7 | 99.7 | 88.7 | 90.1 |
| +3 ml | 105.5 | 106.5 | 107.4 | 105.5 | 105.3 | 105.3 | | 98.7 |
| Operating Conditions: | | | | | | | | |
| Hours on Oil | 140–146 | 146–153 | 153–160 | 165–172 | 172–179 | 180–187 | | |
| Temp., °F | 925.6 | 925.2 | 924.8 | 924.6 | 924.4 | 924.3 | | |
| WHSV | 2.0 | 2.0 | 2.0 | 2.0 | 2.0 | 2.0 | | |
| Recycle Ratio, mol/mol: | | | | | | | | |
| Total Gas | 7.0 | 7.0 | 7.0 | 7.0 | 7.0 | 7.0 | | |
| Hydrogen | | | | 4.2 | 3.7 | 3.3 | | |
| Press., p.s.i.g.: | | | | | | | | |
| Total | 500 | 500 | 500 | 500 | 502 | 502 | | |
| Hydrogen (diffusion unit) | | | | 298 | 267 | 233 | | |
| Hydrogen Bleed Rate, mol/mol feed | | | | 1.2 | 1.2 | 1.3 | | |
| Yield Based on 100% Recovery: | | | | | | | | |
| $H_2$, wt. percent | | | | 2.2 | 2.2 | 2.4 | | |
| $C_1$–$C_4$, wt. percent | | | | 12.8 | 13.5 | 14.1 | | |
| $C_5^+$, wt. percent | | | | 85.0 | 84.3 | 83.5 | | |
| $C_5^+$, vol. percent | | | | 78.0 | 79.3 | 78.4 | | |
| $C_1$, wt. percent | | | | 0.8 | 1.3 | 1.4 | | |
| $C_2$, wt. percent | | | | 2.8 | 2.8 | 3.7 | | |
| $C_3$, wt. percent | | | | 5.7 | 6.0 | 6.0 | | |
| $iC_4$, wt. percent | | | | 2.0 | 2.2 | 2.0 | | |
| $nC_4$, wt. percent | | | | 1.5 | 1.2 | 1.0 | | |
| Aromatics, vol. percent on Feed | | | | 52 | 54 | 53 | | |
| Product Inspections: | | | | | | | | |
| Density, 60/60 | 0.810 | 0.809 | 0.809 | 0.809 | 0.809 | 0.810 | | |
| Aniline Point, °F | 92.1 | 92.5 | 92.5 | 93.2 | 93.2 | 91.6 | | |
| Aromatics, vol. percent | 68 | 68 | 68 | 67 | 68 | 68 | | |
| RON: | | | | | | | | |
| Clear | 98.5 | 98.4 | 98.0 | 98.1 | 99.1 | 99.4 | | |
| +3 ml | 104.9 | 104.1 | 103.7 | 103.7 | 104.4 | 104.7 | | |

TABLE III—Continued

| Operating Conditions: | | | | | | |
|---|---|---|---|---|---|---|
| Hours on Oil | 187–194 | 194–201 | 201–208 | 208–215 | 2/6–12 | 2/12–18 |
| Temp., °F | 925.5 | 925.7 | 924.6 | 925.0 | 896.0 | 896.0 |
| WHSV | 2.0 | 2.0 | 2.0 | 2.0 | 2.0 | 2.0 |
| Recycle Ratio, mol/mol: | | | | | | |
| Total Gas | 7.0 | 7.0 | 7.0 | 7.0 | 7.0 | 7.0 |
| Hydrogen | 3.1 | 3.0 | 3.0 | 3.0 | | |
| Press., p.s.i.g.: | | | | | | |
| Total | 500 | 500 | 499 | 499 | 500 | 500 |
| Hydrogen (diffusion unit) | 220 | 217 | 216 | 212 | | |
| Hydrogen Bleed Rate, mol/mol feed | 1.3 | 1.3 | 1.3 | 1.3 | | |
| Yield Based on 100% Recovery: | | | | | | |
| $H_2$, wt. percent | 2.3 | 2.3 | 2.3 | 2.3 | 1.7 | 1.7 |
| $C_1$–$C_4$, wt. percent | 14.7 | 13.3 | 13.2 | 14.2 | 15.7 | 14.5 |
| $C_5^+$, wt. percent | 83.0 | 84.4 | 84.5 | 83.5 | 82.6 | 83.8 |
| $C_5^+$, vol. percent | 77.2 | 78.7 | 79.0 | 78.1 | 78.7 | 79.9 |
| $C_1$, wt. percent | 1.5 | 1.4 | 1.6 | 1.8 | 1.7 | 2.0 |
| $C_2$, wt. percent | 3.6 | 3.4 | 3.5 | 3.5 | 3.2 | 3.0 |
| $C_3$, wt. percent | 5.7 | 5.0 | 5.1 | 5.5 | 5.9 | 5.1 |
| $iC_4$, wt. percent | 2.0 | 1.9 | 1.9 | 2.0 | 2.2 | 1.9 |
| $nC_4$, wt. percent | 1.9 | 1.6 | 1.1 | 1.4 | 2.7 | 2.5 |
| Aromatics, vol. percent on Feed | 54 | 54 | 55 | 54 | 46 | 47 |
| Product Inspections: | | | | | | |
| Density, 60/60 | 0.818 | 0.816 | 0.814 | 0.814 | 0.799 | 0.798 |
| Aniline Point, °F | 88.9 | 90.7 | 90.7 | 90.7 | 101.1 | 101.8 |
| Aromatics, vol. percent | 70 | 69 | 69 | 69 | 59 | 59 |
| RON: | | | | | | |
| Clear | 99.5 | 99.5 | 98.8 | 98.8 | 93.8 | 93.2 |
| +3 ml | 104.8 | 104.4 | 103.9 | 103.9 | 100.4 | 100.5 |

EXAMPLE 4

This example demonstrates the effect of hydrogen withdrawal from the recycle gas stream alone and in combination with methane addition to maintain hydrogen content of the recycle gas stream at a given level.

The apparatus was the same as that employed in Example 3 and the catalyst was the same as that employed in Example 1.

The feed charged to the unit was a highly paraffinic naphtha obtained by Udex extraction of a $C_8$ reformate fraction and had the following inspections:

ASTM Dist. °F.:
- Initial B.P. _____ 242
- 5% _____ 252
- 10% _____ 254
- 20% _____ 257
- 30% _____ 258
- 40% _____ 260
- 50% _____ 262
- 60% _____ 264
- 70% _____ 266
- 80% _____ 270
- 90% _____ 276
- 95% _____ 283
- E.P. _____ 297

Sulfur, p.p.m. _____ 0.4
Density 60/60 _____ .722
Paraffins, vol. percent _____ 91
Naphthenes, vol. percent _____ 0
Aromatics, vol. percent _____ 9
Aniline Point _____ 68.0° C.

After 212 hours and after the next 25 hours the catalyst was regenerated at 850° F. and 400 p.s.i.g. using regeneration gas having 0.7% oxygen content. Recycle ratio was varied from 7 to 55. At hour 42 after the second regeneration, methane was added to the recycle gas stream at a point just prior to the reactor.

TABLE IV
[Run No. 1863]

| Operating Conditions: | | | | | | | | | | |
|---|---|---|---|---|---|---|---|---|---|---|
| Hours on Oil | 6–12 | 12–18 | 20–26 | 26–32 | 32–38 | 46–54 | 54–62 | 62–70 | 70–78 | 78–86 |
| Temp., °F | 894.7 | 894.7 | 895.3 | 895.1 | 895.1 | 895.3 | 895.5 | 895.1 | 895.1 | 895.1 |
| WHSV | 2.0 | 2.0 | 2.0 | 2.0 | 2.0 | 2.0 | 2.0 | 2.0 | 2.0 | 2.0 |
| Recycle Ratio | 7.0 | 7.0 | 10.0 | 10.0 | 9.9 | 10.0 | 10.1 | 9.9 | 9.9 | 10.0 |
| Pressure: | | | | | | | | | | |
| Total | 500 | 500 | 500 | 500 | 500 | 500 | 500 | 500 | 500 | 500 |
| Hydrogen (diffusion unit) | 332 | 332 | 245 | 225 | 215 | 204 | 194 | 192 | 189 | 180 |
| Hydrogen Bleed Rate (cu. ft./bbl. of feed uncorrected) | | | 799 | 802 | 802 | 803 | 825 | 803 | 803 | 806 |
| Yield Based on 100% Recovery: | | | | | | | | | | |
| $H_2$, wt. percent | 1.3 | 1.3 | 2.0 | 2.0 | 2.1 | 1.9 | | | 1.9 | |
| $C_1$–$C_4$, wt. percent | 27.6 | 27.5 | 23.7 | 24.4 | 26.4 | 22.5 | | | 20.8 | |
| $C_5^+$, wt. percent | 71.1 | 71.2 | 74.3 | 73.6 | 71.5 | 75.6 | | | 77.3 | |
| $C_5^+$, vol. percent | 66.5 | 66.8 | 69.3 | 68.3 | 67.3 | 70.2 | | | 72.0 | |
| $C_1$, wt. percent | 3.0 | 3.0 | 1.6 | 2.1 | 2.0 | 2.0 | | | 1.71 | |
| $C_2$, wt. percent | 4.2 | 4.4 | 3.6 | 3.9 | 3.6 | 3.7 | | | 3.4 | |
| $C_3$, wt. percent | 10.1 | 9.3 | 7.9 | 7.8 | 6.9 | 7.9 | | | 6.7 | |
| $iC_4$, wt. percent | 4.5 | 4.6 | 4.6 | 4.4 | 8.7 | 4.1 | | | 4.2 | |
| $nC_4$, wt. percent | 5.8 | 6.2 | 6.0 | 6.2 | 4.2 | 4.8 | | | 4.7 | |
| Aromatics, vol. percent on Feed | | | | | | | | | | |
| Product Inspections: | | | | | | | | | | |
| Density, 60/60 | 0.7714 | 0.7689 | 0.7735 | 0.7780 | 0.7670 | 0.7770 | | | 0.7750 | |
| Aniline Pt., °F | 42.2 | 42.8 | 41.6 | 41.6 | 42.2 | 42.2 | 42.6 | 43.8 | 44.0 | 44.6 |
| Aromatics, vol. percent | 52 | 51 | 54 | 55 | 53 | 54 | 54 | 51 | 51 | 50 |
| RON: | | | | | | | | | | |
| Clear | 91.3 | 91.4 | 92.6 | 93.6 | 93.0 | 90.6 | 90.7 | 89.4 | 89.1 | 88.6 |
| +3 ml | 99.3 | 99.1 | 99.0 | 100.1 | 99.6 | 99.3 | 99.3 | 97.7 | 97.7 | 97.1 |

| Operating Conditions: | | | | | | | | | | |
|---|---|---|---|---|---|---|---|---|---|---|
| Hours on Oil | 86–94 | 94–102 | 102–110 | 118–126 | 129–137 | 143–151 | 156–161 | 164–172 | 172–180 | 180–188 | 193–200 |
| Temp., °F | 895.3 | 895.1 | 895.1 | 900.1 | 905.4 | 905.2 | 905.2 | 905.0 | 906.3 | 905.7 | 925.2 |
| WHSV | 2.0 | 2.0 | 2.0 | 2.0 | 2.0 | 2.0 | 2.0 | 2.0 | 2.0 | 2.0 | 2.0 |
| Recycle Ratio | 9.8 | 10.0 | 10.0 | 9.9 | 9.8 | 10.2 | 10.1 | 10.3 | 10.3 | 9.9 | 10.1 |
| Pressure: | | | | | | | | | | | |
| Total | 500 | 500 | 500 | 500 | 500 | 500 | 500 | 500 | 500 | 500 | 500 |
| Hydrogen (diffusion unit) | 184 | 179 | 169 | 176 | 165 | 312 | 243 | 188 | 171 | 160 | 297 |
| Hydrogen Bleed Rate (cu. ft./bbl. of feed uncorrected) | 801 | 801 | 799 | 782 | 804 | | 547 | 764 | 803 | 784 | |

TABLE IV—Continued

| Yield Based on 100% Recovery: | | | | | | | | | | | |
|---|---|---|---|---|---|---|---|---|---|---|---|
| H₂, wt. percent | | 1.8 | | 1.7 | 1.8 | 0.8 | 1.4 | 1.8 | | 1.7 | 1.2 |
| C₁-C₄, wt. percent | | 19.8 | | 21.4 | 21.5 | 21.5 | 22.0 | 19.5 | | 19.9 | 27.3 |
| C₅⁺, wt. percent | | 78.4 | | 76.9 | 76.7 | 77.7 | 76.6 | 78.6 | | 78.4 | 71.4 |
| C₅⁺, vol. percent | | 73.5 | | 73.5 | 71.8 | 74.1 | 72.4 | 73.8 | | 73.4 | 66.6 |
| C₁, wt. percent | | 1.4 | | 1.5 | 1.7 | 2.2 | 1.5 | 1.1 | | 1.5 | 3.0 |
| C₂, wt. percent | | 3.3 | | 3.5 | 3.6 | 3.9 | 3.8 | 3.6 | | 3.8 | 5.8 |
| C₃, wt. percent | | 6.7 | | 6.9 | 6.5 | 7.3 | 7.3 | 6.5 | | 6.5 | 9.2 |
| iC₄, wt. percent | | 3.8 | | 4.1 | 4.2 | 3.4 | 4.1 | 3.9 | | 3.9 | 4.2 |
| nC₄, wt. percent | | 4.6 | | 5.4 | 5.5 | 4.7 | 5.4 | 4.3 | | 4.2 | 5.1 |
| Aromatics, Vol. percent on Feed | | | | | | | | | | | |
| Product Inspections: | | | | | | | | | | | |
| Density, 60/60 | | 0.7695 | | 0.7690 | 0.7710 | 0.7565 | 0.7629 | 0.7684 | | 0.7727 | 0.7704 | 0.7738 |
| Aniline Pt., °F | 45.6 | 46.2 | 46.0 | 45.4 | 44.8 | 50.6 | 47.8 | 45.8 | | 44.6 | 45.4 | 43.8 |
| Aromatics, Vol. percent | 49 | 48 | 48 | 49 | 50 | | 47 | 49 | | 51 | 49 | 51 |
| RON: | | | | | | | | | | | |
| Clear | 87.4 | 87.4 | 86.4 | 87.8 | 88.0 | 79.1 | 83.7 | 87.7 | | 88.6 | 87.0 | 88.8 |
| +3 ml | 96.6 | 96.6 | 96.3 | 96.6 | 97.3 | 92.5 | (*) | 97.1 | | 97.5 | 97.0 | 97.7 |

| Operating Conditions: | | | 2 | 2 | 2 | 3 | 3 | 3 | 3 | 3 | 3 |
|---|---|---|---|---|---|---|---|---|---|---|---|
| Hours on Oil | 203-206 | 206-212 | /6-12 | /12-18 | /22-25 | /6-12 | /12-18 | /21-27 | /27-33 | /33-39 | /39-42 |
| Temp., °F | 924.6 | 924.4 | 895.5 | 895.8 | 895.5 | 895.1 | 895.5 | 894.9 | 895.1 | 893.5 | 895.3 |
| WHSV | 2.0 | 2.0 | 2.0 | 2.0 | 2.0 | 2.0 | 2.0 | 2.0 | 2.0 | 2.0 | 2.0 |
| Recycle Ratio | 10.0 | 9.8 | 7.0 | 7.0 | 54.7 | 54.0 | 54.0 | 54.5 | 55.3 | 53.8 | 53.0 |
| Pressure: | | | | | | | | | | | |
| Total | 500 | 500 | 500 | 500 | 500 | 500 | 500 | 500 | 500 | 500 | 500 |
| Hydrogen (diffusion unit) | 210 | 185 | | | | 298 | 308 | 271 | 268 | 270 | 272 |
| Hydrogen Bleed Rate (cu. ft./bbl. of feed uncorrected) | 787 | 799 | | | | | | 516 | 536 | 528 | 524 |
| Yield Based on 100% Recovery: | | | | | | | | | | | |
| H₂, wt. percent | 1.9 | 1.9 | 1.0 | 0.8 | 1.1 | 1.4 | 1.5 | 2.0 | 2.0 | 2.5 | |
| C₁-C₄, wt. percent | 23.4 | 24.5 | 31.2 | 31.2 | 19.9 | 27.9 | 26.1 | 22.9 | 21.9 | 21.8 | |
| C₅⁺, wt. percent | 74.7 | 73.6 | 67.8 | 68.0 | 79.0 | 70.7 | 72.4 | 75.1 | 76.1 | 75.7 | |
| C₅⁺, vol. percent | 69.4 | 68.1 | 63.7 | 64.5 | 75.4 | 65.0 | 67.0 | 69.1 | 70.0 | 70.0 | |
| C₁, wt. percent | 1.1 | 1.7 | 2.5 | 2.3 | 2.2 | 5.1 | 4.5 | 3.7 | 3.8 | 3.8 | |
| C₂, wt. percent | 4.6 | 4.71 | 4.6 | 5.0 | 3.8 | 4.8 | 4.5 | 4.1 | 4.1 | 4.1 | |
| C₃, wt. percent | 8.0 | 7.7 | 10.6 | 11.2 | 6.9 | 9.7 | 8.8 | 7.5 | 7.0 | 6.9 | |
| iC₄, wt. percent | 4.5 | 4.5 | 5.6 | 4.6 | 2.9 | 3.2 | 3.2 | 3.0 | 2.8 | 2.9 | |
| nC₄, wt. percent | 5.2 | 2.9 | 7.8 | 8.1 | 4.0 | 5.1 | 5.0 | 4.6 | 4.3 | 4.1 | |
| Aromatics, vol. percent on Feed | | | | | | | | | | | |
| Product Inspections: | | | | | | | | | | | |
| Density, 60/60 | 0.7762 | 0.7800 | 0.7677 | 0.7607 | 0.7558 | 0.7848 | 0.7800 | 0.7843 | 0.7849 | 0.7807 | |
| Aniline Pt., °F | 41.6 | 40.8 | 42.8 | 45.2 | 52.4 | 39.4 | 41.0 | 40.2 | 40.2 | 41.0 | 40.8 |
| Aromatics, vol. percent | 54 | 56 | | 50 | 39 | 57 | 54 | | | | |
| RON: | | | | | | | | | | | |
| Clear | 92.2 | 92.6 | 92.3 | 90.4 | 74.6 | 92.4 | 91.0 | 92.2 | 92.1 | 91.7 | 91.0 |
| +3 ml | (*) | 99.3 | 99.2 | 99.0 | (*) | 99.0 | 98.6 | 99.2 | 99.2 | 98.7 | |

| Operating Conditions: | 3 | 3 | 3 | 3 | 3 | 3 | 3 | 3 | 3 | 3 | 3 |
|---|---|---|---|---|---|---|---|---|---|---|---|
| Hours on Oil | /46-52 | /52-58 | /58-66 | /66-74 | /74-82 | /82-90 | /90-98 | /98-106 | /106-110 | /115-123 | /123-131 |
| Temp., °F | 895.1 | 895.1 | 895.7 | 895.1 | 895.1 | 895.9 | 895.3 | 895.3 | 895.3 | 895.3 | 895.5 |
| WHSV | 2.0 | 2.0 | 2.0 | 2.0 | 2.0 | 2.0 | 2.0 | 2.0 | 2.0 | 2.0 | 2.0 |
| Recycle Ratio | 55.4 | 55.0 | 54.7 | 54.5 | 55.2 | 54.4 | 55.0 | 54.9 | 54.3 | 55.0 | 55.3 |
| Pressure: | | | | | | | | | | | |
| Total | 500 | 500 | 500 | 500 | 500 | 500 | 500 | 500 | 500 | 500 | 500 |
| Hydrogen (diffusion unit) | 240 | 240 | 239 | 239 | 238 | 240 | 240 | 239 | 239 | 188 | 186 |
| Hydrogen Bleed Rate (cu. ft./bbl. of feed uncorrected) | 514 | 508 | 502 | 515 | 522 | 509 | 516 | 515 | 511 | 899 | 867 |
| Methane Addition Rate, mol/mol Naphtha Feed | 0.30 | 0.27 | 0.29 | 0.29 | 0.30 | 0.29 | 0.28 | 0.29 | 0.29 | 0.29 | 0.29 |
| Yield Based on 100% Recovery: | | | | | | | | | | | |
| H₂, wt. percent | 2.5 | 2.4 | | | 2.4 | | 2.3 | | 2.6 | 2.6 | |
| C₁-C₄, wt. percent | 21.9 | 21.2 | | | 19.8 | | 19.2 | | 18.2 | 17.5 | |
| C₅⁺, wt. percent | 75.6 | 76.5 | | | 77.8 | | 78.5 | | 79.2 | 79.9 | |
| C₅⁺, vol. percent | 68.4 | 69.5 | | | 70.9 | | 71.8 | | | | |
| C₁, wt. percent | 3.0 | 3.4 | | | 3.1 | | 3.1 | | 2.6 | 2.3 | |
| C₂, wt. percent | 4.2 | 3.8 | | | 3.7 | | 3.6 | | 3.3 | 3.2 | |
| C₃, wt. percent | 7.1 | 6.7 | | | 6.4 | | 6.0 | | 6.5 | 6.3 | |
| iC₄, wt. percent | 3.0 | 2.9 | | | 2.6 | | 2.6 | | 2.4 | 2.3 | |
| nC₄, wt. percent | 4.6 | 4.3 | | | 4.0 | | 3.8 | | 3.4 | 3.4 | |
| Aromatics, vol. percent on Feed | | | | | | | | | | | |
| Product Inspections: | | | | | | | | | | | |
| Density, 60/60 | 0.7975 | 0.7945 | | | 0.7922 | | 0.7888 | | | | |
| Aniline Pt., °F | 37.0 | 38.2 | 38.8 | 39.0 | 39.0 | 40.0 | 39.7 | 40.2 | 40.6 | 37.6 | 39.0 |
| Aromatics, vol. percent | 60 | 60 | 59 | 59 | 59 | 58 | 58 | | | | |
| RON: | | | | | | | | | | | |
| Clear | 94.6 | 93.6 | 92.9 | 92.7 | 92.5 | 91.8 | 92.0 | 91.2 | 91.2 | 94.3 | 93.4 |
| +3 ml | 99.9 | 99.6 | 99.4 | 99.4 | 99.0 | 98.8 | 99.0 | 99.0 | 98.8 | 99.9 | 99.8 |

| Operating Conditions: | 3 | 3 | 3 | 3 | 3 | 3 | 3 | 3 | 3 |
|---|---|---|---|---|---|---|---|---|---|
| Hours on Oil | /131-138 | /141-149 | /149-157 | /157-165 | /165-173 | /173-181 | /181-189 | /192-199 | /199-206 |
| Temp., °F | 895.5 | 895.1 | 895.1 | 894.7 | 895.1 | 895.1 | 895.1 | 895.1 | 895.1 |
| WHSV | 2.0 | 2.0 | 2.0 | 2.0 | 2.0 | 2.0 | 2.0 | 2.0 | 2.0 |
| Recycle Ratio | 55.2 | 35.2 | 35.2 | 34.0 | 35.5 | 35.6 | 35.3 | 20.6 | 20.0 |
| Pressure: | | | | | | | | | |
| Total | 500 | 500 | 500 | 500 | 500 | 500 | 500 | 500 | 500 |
| Hydrogen (diffusion unit) | 187 | 185 | 185 | 188 | 187 | 186 | 187 | 187 | 185 |
| Hydrogen Bleed Rate, mol/mol feed | 1.1 | 1.0 | 1.0 | 1.0 | 1.0 | 0.9 | 0.9 | 0.8 | 0.8 |
| Yield Based on 100% Recovery: | | | | | | | | | |
| H₂, wt. percent | 2.7 | 2.4 | 2.3 | | 2.5 | | 2.3 | 2.1 | 2.0 |
| C₁-C₄, wt. percent | 17.6 | 18.8 | 20.2 | | 18.5 | | 18.8 | 20.6 | 21.5 |
| C₅⁺, wt. percent | 79.9 | 78.8 | 77.6 | | 78.9 | | 78.9 | 77.3 | 76.4 |
| C₅⁺, vol. percent | 72.9 | 71.9 | 71.1 | | 72.8 | | 72.6 | 71.3 | 70.6 |
| C₁, wt. percent | 2.7 | 2.3 | 2.6 | | 2.4 | | 2.6 | 1.8 | 2.0 |
| C₂, wt. percent | 3.2 | 3.3 | 3.9 | | 3.2 | | 3.3 | 3.9 | 3.8 |
| C₃, wt. percent | 6.2 | 6.3 | 6.6 | | 6.3 | | 6.5 | 7.2 | 7.4 |
| iC₄, wt. percent | 2.3 | 2.9 | 3.0 | | 2.8 | | 2.7 | 3.4 | 3.7 |
| nC₄, wt. percent | 3.2 | 4.0 | 4.1 | | 3.8 | | 3.7 | 4.3 | 4.6 |
| Aromatics, vol. percent on Feed | 42 | 41 | 41 | | 41 | | 41 | 41 | 39 |
| Product Inspections: | | | | | | | | | |
| Density, 60/60 | 0.791 | 0.790 | 0.788 | | 0.782 | | 0.784 | 0.782 | 0.781 |
| Aniline Pt., °F | 102.9 | 102.4 | 104.0 | 106.9 | 104.8 | 105.4 | 105.8 | 105.1 | |
| Aromatics, vol. percent | 58 | 57 | 57 | 54 | 57 | 57 | 57 | 57 | 55 |
| RON: | | | | | | | | | |
| Clear | 92.0 | 93.3 | 92.1 | 91.0 | 92.0 | 91.8 | 91.0 | 91.9 | 91.1 |
| +3 ml | 98.9 | 99.2 | 98.8 | 98.6 | 98.8 | 98.9 | 99.1 | 99.7 | 99.4 |

*Insufficient sample.

The data demonstrate two types of operation: (1) where the hydrogen content of the recycle gas stream is permitted to vary, and (2) where the hydrogen content of the recycle gas stream is maintained substantially constant at a given level permitting optimum operation for a given set of other variables to control product octane and yield and catalyst life.

Examination of the test data in Tables III and IV discloses that significant yield-octane improvement results from the lowering of the hydrogen partial pressure in the reforming of naphthas at a given total pressure. For example, compare normal 500 p.s.i.g. operation at 895° F. with operation at lowered hydrogen partial pressure in the case of a relatively high naphthene content feed.

REFORMING EFFECT OF LOWERED $H_2$ PRESSURE

[Run 1707—2 WHSV, 7/1 Recycle, 500 p.s.i.g.]

| Hrs. on Oil | 12/18 | 36/41 | 65/171 | 201/208 |
|---|---|---|---|---|
| Temp., ° F | 895 | 895 | 894 | 925 |
| $H_2$ Press., p.s.i.g | 428 | 261 | 309 | 216 |
| RON (Clear) | 93.0 | 95.8 | 92.6 | 98.8 |
| $C_5^+$, vol. percent | 77.2 | 79.2 | 83.3 | 79.0 |
| $H_2$, wt. percent | 1.7 | 2.5 | 2.0 | 2.3 |
| $C_2/C_1$, mol ratio | 1.0 | 1.4 | 1.7 | 1.2 |

It is seen from the above tabulation that reducing the hydrogen pressure from 428 to 261 p.s.i.g. not only gave a two percent improvement in liquid yield but also a better than two unit improvement in octane level as well. Furthermore, it was possible to improve product octane still more without lowering product yield as, for example, in the 201/208 hour test period. It should also be noted that, after an intervening higher temperature period, a yield improvement of six percent was obtained at the 93 octane level as compared to normal operation (hrs. 65/71 vs. hrs. 12/18).

In addition to the other benefits of operation at low hydrogen partial pressure, hydrogen production is improved and methane production is reduced. In normal operation the $C_2/C_1$ mol ratio was found to be 1.0 or lower (a value lower than unity indicates excessive methanation). On the other hand, with lowered hydrogen partial pressure operation a ratio as high as 2.4 was obtained (130–136 hrs.). Thus, methane production is inhibited even more than is the total production of light hydrocarbons. There is also an indication that the $iC_4/nC_4$ ratio is shifted in a favorable direction.

Lowered hydrogen partial pressure also gave marked improvement in performance with the highly paraffinic-low naphthene content raffinate feed. This is shown by the following data.

REFORMING OF $C^8$ RAFFINATE—EFFECT OF LOWERED $H_2$ PRESSURE

[Run 1863—895° F., 2 WSHV, 500 p.s.i.g.]

| Hrs. on Oil | 12/18 | 26/32 |
|---|---|---|
| Recycle Ratio | 7/1 | 10/1 |
| $H_2$ Press., p.s.i.g | 332 | 225 |
| RON (Clear) | 91.4 | 93.6 |
| $C_5^+$, vol. percent | 66.8 | 68.3 |
| $H_2$, wt. percent | 1.3 | 2.0 |
| $C_2/C_1$, mol ratio | 0.8 | 1.0 |

As in any reforming operation, lowering the relative hydrogen concentration can be expected to result in more rapid catalyst aging. In the case of low hydrogen partial pressure reforming, however, the situation is somewhat more favorable than in normal low pressure operation. This is because the much higher density of the recycle gas makes it possible to use a higher recycle ratio for a given cost than in low total pressure operation. Further, the presence of extra methane in the recycle gas does not contribute to coke laydown since methane is thermodynamically stable under typical reforming conditions (unlike all other hydrocarbons).

To show what can be accomplished by taking advantage of some of the possibilities of low hydrogen partial pressure operation, a constant temperature, constant octane cycle was programmed with the abnormally high aging rate $C_8$ raffinate feed. Conditions for the run were set at 895° F., 2 WHSV, 55/1 initial gas recycle ratio, and 500 p.s.i.g. total pressure. The initial two periods of normal operation gave a product of 91–92 octane clear. Thereafter operation was at a reduced hydrogen partial pressure and at an octane level of greater than 91 (clear).

Examination of the third cycle data of Run 1863 (Table IV) show that not only was the rate of catalyst deactivation greatly reduced but that the yields obtained were equal to or better than those of the first cycle. At the 138th hour the recycle ratio was dropped to 35/1 and at the 189th hour to 20/1. After 206 hours of operation the catalyst was regenerated and found to have picked up only 0.7% carbon. On the basis of the third cycle data, it is believed that a cycle life of over 500 hours could be realized at constant octane and constant temperature, with liquid yields equivalent to those of normal 7/1 recycle operation at 350 p.s.i.g.

In lower hydrogen partial pressure operation the hydrogen partial pressure is, of course, a new operating variable. Thus, one can raise both liquid yield and octane level by lowering the hydrogen partial pressure. On the other hand, one can maintain a given hydrogen partial pressure level regardless of catalyst aging or changes in other operating variables. Thus in the third cycle of Run 1863, the hydrogen partial pressure was controlled in sequence at three different levels (270, 240 and 185 p.s.i.g.).

A consequence of hydrogen partial pressure control is that it is not necessary to control total pressure in order to control catalyst aging. Thus operation with a floating total pressure is possible with maximum total pressure limited according to safety or other requirements.

Low hydrogen partial pressure operation, as does low total pressure operation, results in greatly increased hydrogen yields. In the case of operation with a diffusion unit in the recycle gas circuit, as was the situation in Examples 3 and 4, this hydrogen production can be obtained as ultra-high purity gas and thus is of considerably increased value.

I claim:

1. In a process for reforming naphtha hydrocarbon stocks in the presence of hydrogen-containing recycle gas consisting essentially of hydrogen and at least one $C_1$ to $C_3$ alkane with a platinum metal on alumina reforming catalyst in a reforming reaction system including a successive series of reaction zones under reforming conditions producing a net hydrogen make of at least about 250 standard cubic feet of hydrogen per barrel of naphtha hydrocarbon charge stock including temperatures within the range of about 875° to about 990° F., a weight hourly space velocity of 1 to 20, a ratio of about 3 to 50 moles of hydrogen per mole of hydrocarbon charge stock and a total pressure of about 300 to 1000 p.s.i.g., the improvement which comprises separating substantially pure hydrogen from the reforming reaction system at a point intermediate the first and last reaction zones in an amount of at least about 250 standard cubic feet of hydrogen per barrel of naphtha hydrocarbon charge stock.

2. In a process for reforming naphtha hydrocarbon stocks in the presence of hydrogen-containing recycle gas consisting essentially of hydrogen and at least one $C_1$ to $C_3$ alkane with a platinum metal on alumina reforming catalyst in a reforming reaction system including a successive series of reaction zones under reforming conditions producing a net hydrogen make of at least about 250 standard cubic feet of hydrogen per barrel of naphtha hydrocarbon charge stock including temperatures within the range of about 875° to about 990° F., a weight hourly space velocity of 1 to 20, a ratio of about 3 to 50 moles of hydrogen per mole of hydrocarbon charge stock and a total pressure of about 300 to 1000 p.s.i.g., the improvement which comprises separating substantially pure hydrogen from the reforming reaction system at a point intermediate the first and last reaction zones in an amount of at least about 250 standard cubic feet of hydrogen per barrel of naphtha hydrocarbon charge stock by passing the reaction effluent through a palladium diffuser.

3. In a process for reforming naphtha hydrocarbon stocks in the presence of hydrogen-containing recycle gas consisting essentially of hydrogen and at least one $C_1$ to $C_3$ alkane with a platinum metal on alumina reforming catalyst in a reforming reaction system including a successive series of reaction zones under reforming conditions producing a net hydrogen make of at least about 250 standard cubic feet of hydrogen per barrel of naphtha hydrocarbon charge stock including temperatures within the range of about 875° to about 990° F., a weight hourly space velocity of 1 to 20, a ratio of about 3 to 50 moles of hydrogen per mole of hydrocarbon charge stock and a total pressure of about 300 to 1000 p.s.i.g., the improvement which comprises separating substantially pure hydrogen from the reforming reaction system at a point intermediate the first and last reaction zones in an amount of at least about 250 standard cubic feet of hydrogen per barrel of naphtha hydrocarbon charge stock up to the net hydrogen make of the reforming reaction system by passing the reaction effluent through a palladium diffuser.

4. In a process for reforming naphtha hydrocarbon stocks in the presence of hydrogen-containing recycle gas consisting essentially of hydrogen and at least one $C_1$ to $C_3$ alkane with a platinum metal on alumina reforming catalyst in a reforming reaction system under reforming conditions including a successive series of reaction zones including temperatures within the range of about 875° to about 990° F., a weight hourly space velocity of 1 to 20, a ratio of about 3 to 50 moles of hydrogen per mole of hydrocarbon charge stock and a total pressure of about 300 to 1000 p.s.i.g., the improvement which comprises separating from the reaction effluent a gas fraction consisting essentially of hydrogen and at least one $C_1$ to $C_3$ alkane, separating substantially pure hydrogen in an amount of at least about 250 standard cubic feet per barrel of naphtha hydrocarbon charge stock from at least a portion of the separated fraction, and recycling the fraction so enriched in alkane content to the reforming reaction system by passing the reaction effluent through a palladium diffuser.

5. The process of claim 4 wherein the catalyst is platinum on alumina.

6. In a process for reforming naphtha hydrocarbon stocks in the presence of hydrogen-containing recycle gas consisting essentially of hydrogen and at least one $C_1$ to $C_3$ alkane with a platinum metal on alumina reforming catalyst in a reforming reaction system under reforming conditions producing a net hydrogen make of at least about 250 standard cubic feet of hydrogen per barrel of naphtha hydrocarbon charge stock including temperatures within the range of about 875° to about 990° F., a weight hourly space velocity of 1 to 20, a ratio of about 3 to 50 moles of hydrogen per mole of hydrocarbon charge stock and a total pressure of about 300 to 1000 p.s.i.g., the improvement which comprises separating substantially pure hydrogen from the reforming reaction system in an amount of at least about 250 standard cubic feet of hydrogen per barrel of naphtha hydrocarbon charge stock, and adding to the system a $C_1$ to $C_3$ alkane in an amount sufficient to maintain the hydrogen partial pressure in the hydrogen-containing recycle gas within the range of about 100 to 350 p.s.i.g. and a $C_1$ to $C_3$ partial pressure in said recycle gas higher than about 40% of the hydrogen partial pressure in the hydrogen-containing recycle gas stream.

References Cited by the Examiner
UNITED STATES PATENTS

| | | | |
|---|---|---|---|
| 2,550,531 | 4/1951 | Ciapetta | 208—138 |
| 2,838,444 | 5/1958 | Teter et al. | 208—139 |
| 2,863,826 | 12/1958 | Holcomb et al. | 208—138 |
| 2,870,083 | 1/1959 | Elliott | 208—138 |
| 2,905,620 | 9/1959 | Haensel | 208—138 |
| 2,909,480 | 10/1959 | Henke | 208—138 |
| 2,913,403 | 11/1959 | Rex et al. | 208—138 |
| 2,952,611 | 9/1960 | Haxton et al. | 208—65 |
| 2,984,619 | 5/1961 | Butler et al. | 208—65 |
| 3,007,862 | 11/1961 | Patton et al. | 208—65 |

DELBERT E. GANTZ, *Primary Examiner.*

ALPHONSO D. SULLIVAN, *Examiner.*

H. LEVINE, *Assistant Examiner.*